US011328486B2

(12) United States Patent
Tkach et al.

(10) Patent No.: US 11,328,486 B2
(45) Date of Patent: May 10, 2022

(54) VOLUMETRIC CAPTURE OF OBJECTS WITH A SINGLE RGBD CAMERA

(71) Applicant: Google LLC, Mountain View, CA (US)

(72) Inventors: Anastasia Tkach, Zurich (CH); Ricardo Martin Brualla, Mountain View, CA (US); Shahram Izadi, Tiburon, CA (US); Shuoran Yang, Mountain View, CA (US); Cem Keskin, San Francisco, CA (US); Sean Ryan Francesco Fanello, Mountain View, CA (US); Philip Davidson, Arlington, MA (US); Jonathan Taylor, Mountain View, CA (US); Rohit Pandey, Mountain View, CA (US); Andrea Tagliasacchi, Mountain View, CA (US); Pavlo Pidlypenskyi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 27 days.

(21) Appl. No.: 16/861,530

(22) Filed: Apr. 29, 2020

(65) Prior Publication Data
US 2020/0349772 A1 Nov. 5, 2020

Related U.S. Application Data

(60) Provisional application No. 62/840,905, filed on Apr. 30, 2019.

(51) Int. Cl.
*G06T 19/00* (2011.01)
*G06K 9/00* (2006.01)
(Continued)

(52) U.S. Cl.
CPC ........ *G06T 19/006* (2013.01); *G06K 9/00208* (2013.01); *G06K 9/6257* (2013.01); *G06T 3/0093* (2013.01)

(58) Field of Classification Search
CPC ........... G06K 9/00208; G06K 9/00671; G06K 9/6257; G06K 9/6271; G06T 15/20;
(Continued)

(56) References Cited

U.S. PATENT DOCUMENTS

| | | | |
|---|---|---|---|
| 10,839,557 B1* | 11/2020 | Arora | H04N 13/246 |
| 2011/0210915 A1* | 9/2011 | Shotton | G06K 9/00369 345/157 |
| 2015/0381968 A1* | 12/2015 | Arora | G06T 17/00 348/47 |

OTHER PUBLICATIONS

"3D scanner app", Labs, https://www.3dscannerapp.com/, 2018, 8 pages.
(Continued)

*Primary Examiner* — Sing-Wai Wu
(74) *Attorney, Agent, or Firm* — Brake Hughes Bellermann LLP

(57) ABSTRACT

A method includes receiving a first image including color data and depth data, determining a viewpoint associated with an augmented reality (AR) and/or virtual reality (VR) display displaying a second image, receiving at least one calibration image including an object in the first image, the object being in a different pose as compared to a pose of the object in the first image, and generating the second image based on the first image, the viewpoint and the at least one calibration image.

20 Claims, 12 Drawing Sheets

(51) Int. Cl.
*G06K 9/62* (2006.01)
*G06T 3/00* (2006.01)

(58) Field of Classification Search
CPC .................. G06T 19/00; G06T 19/006; G06T 2207/10028; G06T 2207/20084; G06T 2210/04; G06T 2210/41; G06T 2219/004; G06T 2219/028; G06T 3/0093; G06T 7/73
See application file for complete search history.

(56) References Cited

OTHER PUBLICATIONS

Anderson, et al, "Jump: Virtual Reality Video", ACM TOG, vol. 35, No. 6, Article 198, Nov. 2016, 13 pages.
Balakrishnan, et al, "Synthesizing images of humans in unseen poses", CVPR, Apr. 2018, 9 pages.
Carranza, et al, "Free-Viewpoint Video of Human Actors", SIGGRAPH, 2003, 9 pages.
Casas, et al, "4D Video Textures for Interactive Character Appearance", EUROGRAPHICS, vol. 33, No. 2, 2014, 10 pages.
Chan, et al, "Everybody Dance Now", CoRR, Aug. 2019, 12 pages.
Collet, et al, "High-quality streamable free-viewpoint video", ACM TOG, vol. 34, No. 4, 2015, 13 pages.
Debevec, et al, "Acquiring the reflectance field of a human face", SIGGRAPH, 2000, 12 pages.
Dosovitskiy, et al, "Learning to generate chairs with convolutional networks", CVPR, 2015, pp. 1538-1546.
Dou, et al, "Fusion4d: Real-time performance capture of challenging scenes", SINPNGGRAPH, 2016, 13 pages.
Dou, et al, "Motion2fusion: Real-time volumetric performance capture", SIGGRAPH Asia, 2017, 16 pages.
Du, et al, "Montage4d: Interactive seamless fusion of multiview video textures", Proc. of i3D, 2018, 11 pages.
Eisemann, et al, "Floating textures", Computer Graphics Forum, EUROGRAPHICS, vol. 27, No. 2, 2008, 10 pages.
Fanello, et al, "Ultrastereo: Efficient learning-based matching for active stereo systems", CVPR, 2017, pp. 2691-2700.
Flynn, et al, "Deep stereo: Learning to predict new views from the world's imagery", CVPR, 2016, pp. 5515-5524.
Fyffe, et al, "Single-shot reflectance measurement from polarized color gradient illumination", IEEE International Conference on Computational Photography, 2015, 10 pages.
Guo, et al, "Twinfusion: High framerate non-rigid fusion through fast correspondence tracking", 2018 International Conference on 3D Vision, pp. 596-605.
Innmann, et al, "VolumeDeform: Real-time Volumetric Non-rigid Reconstruction", ECCV, 2016, 17 pages.
Ionescu, et al, "Human3.6m: Large Scale Datasets and Predictive Methods for 3D Human Sensing in Natural Environments", IEEE PAMI, 2014, 15 pages.
Ji, et al, "Deep view morphing", CoRR, Mar. 2017, 28 pages.
Joo, et al, "Total Capture: A 3D Deformation Model for Tracking Faces, Hands, and Bodies", CVPR, Jan. 2018, 10 pages.
Kazhdan, et al, "Screened Poisson Surface Reconstruction", ACM TOG, 2013, 13 pages.
Kowdle, et al, "The need 4 speed in real-time dense visual tracking", SIGGRAPH Asia, 2018, 14 pages.
Krähenbühl, et al, "Efficient Inference in Fully Connected CRFs with Gaussian Edge Potentials", NIPS, 2011, 9 pages.

Ma, et al, "Disentangled Person Image Generation", CVPR, 2018, pp. 99-108.
Ma, et al, "Pose Guided Person Image Generation", NIPS, 2017, 11 pages.
Neverova, et al, "Dense Pose Transfer", ECCV, 2018, 16 pages.
Newcombe, et al, "DynamicFusion: Reconstruction and Tracking of Non-rigid Scenes in Real-Time", CVPR, Jun. 2015, 10 pages.
Orts-Escolano, et al, "Holoportation: Virtual 3D Teleportation in Real-time", UIST, Oct. 2016, 14 pages.
Papandreou, et al, "Towards Accurate Multi-person Pose Estimation in the Wild", CVPR, 2017, pp. 4903-4911.
Park, et al, "Transformation-Grounded Image Generation Network for Novel 3D View Synthesis", CVPR, 2017, pp. 3500-3509.
Prada, et al, "Spatiotemporal Atlas Parameterization for Evolving Meshes", ACM TOG, vol. 36, No. 4, Article 58, Jul. 2017, 12 pages.
Qi, et al, "Semi-parametric Image Synthesis", CoRR, 2018, pp. 8808-8816.
Si, et al, "Multistage Adversarial Losses for Pose-Based Human Image Synthesis", CVPR, 2018, pp. 118-126.
Slavcheva, et al, "KillingFusion: Non-rigid 3D Reconstruction without Correspondences", CVPR, 2017, 10 pages.
Slavcheva, et al, "SobolevFusion: 3D Reconstruction of Scenes Undergoing Free Non-rigid Motion", CVPR, 2018, 10 pages.
Tankovich, et al, "SOS: Stereo Matching in O(1) with Slanted Support Windows", IROS, 2018, 8 pages.
Volino, et al, "Optimal Representation of Multi-View Video", BMVC, 2014, 12 pages.
Zhao, et al, "Multi-View Image Generation from a Single-View", CoRR, 2017, 9 pages.
Zhou, et al, "View Synthesis by Appearance Flow", CoRR, 2016, 16 pages.
Zitnick, et al, "High-quality video view interpolation using a layered representation", ACM TOG, 2004, pp. 600-608.
Chen, et al., "Encoder-Decoder with Atrous Separable Convolution for Semantic Image Segmentation", CoRR, abs/1802.02611, Aug. 22, 2018, 18 pages.
Debevec, et al., "Modeling and rendering architecture from photographs: A hybrid geometry and image-based approach", SIGGRAPH, 1996, 33 pages.
Fanello, et al., "Low Compute and Fully Parallel Computer Vision with HashMatch", ICCV, 2017, 3894-3903.
Goodfellow, et al., "Generative adversarial nets", Advances in Neural Information Processing Systems, vol. 27, 2014, 9 pages.
Gortler, et al., "The lumigraph", SIGGRAPH, 1996, pp. 43-54.
Martin-Brualla, "Lookingood: Enhancing performance capture with real-time neural re-rendering", SIGGRAPH Asia, Nov. 12, 2018, 14 pages.
Richardt, et al., "Megastereo: Constructing High-Resolution Stereo Panoramas", CVPR, 2013, 8 pages.
Ronneberger, et al., "U-Net: Convolutional Networks for Biomedical Image Segmentation", MICCAI, 2015, 8 pages.
Zollhofer, et al., "Real-Time Non-Rigid Reconstruction Using an RGB-D Camera", ACM TOG, vol. 33, No. 4, Article 156, Jul. 2014, 12 pages.
Invitation to Pay Additional Fees and Partial International Search for PCT Application No. PCT/US2020/030723, dated Jul. 13, 2020, 15 pages.
Martin-Brualla, et al., "Lookingood: Enhancing Performance Capture With Real-Time Neural Re-Rendering", ACM Transactions on Graphics, vol. 37, No. 6, Article 255, Nov. 2018, 14 pages.
Pandey, et al., "Volumtric Capture of Humans With a Single RGBD Camera via Semi-Parametric Learning", 2019 IEEE/CVF Conference on Computer Vision and Pattern Recognition (CVPR), 13 pages.

* cited by examiner

VOLUMETRIC CAPTURE OF OBJECTS WITH A SINGLE RGBD CAMERA

CROSS-REFERENCE TO RELATED APPLICATION

This application claims priority to, and the benefit of, U.S. Provisional Patent Application No. 62/840,905, filed on Apr. 30, 2019, entitled "VOLUMETRIC CAPTURE OF HUMANS WITH A SINGLE RGBD CAMERA VIA SEMI-PARAMETRIC LEARNING", the disclosure of which is incorporated by reference herein in its entirety.

FIELD

Embodiments relate to displaying images in a virtual environment and/or in an augmented reality environment (e.g., on a head mount display (HMD)).

BACKGROUND

Complex capture rigs can be used to generate very high-quality volumetric reconstructions (e.g., images). These systems rely on high-end, costly infrastructure to process the high volume of data that the rigs capture. The required computational time of several minutes per frame make current techniques unsuitable for real-time applications. Another way to capture humans is to extend real-time non-rigid fusion pipelines to multi-view capture setups. However, the results suffer from distorted geometry, poor texturing and inaccurate lighting, making it difficult to reach the level of quality required in augmented reality (AR)/virtual reality (VR) applications.

SUMMARY

In a general aspect, a device, a system, a non-transitory computer-readable medium (having stored thereon computer executable program code which can be executed on a computer system), and/or a method can perform a process with a method including receiving a first image including color data and depth data, determining a viewpoint associated with an augmented reality (AR) and/or virtual reality (VR) display displaying a second image, receiving at least one calibration image including an object in the first image, the object being in a different pose as compared to a pose of the object in the first image, and generating the second image based on the first image, the viewpoint and the at least one calibration image.

Implementations can include one or more of the following features. For example, the first image can be received from a single camera configured to capture the color data as red, green, blue (RGB) data and at least one of capture the depth data and generate the depth data based on the color data. The viewpoint associated with the AR and/or VR display can be different than a viewpoint associated with the first image. The at least one calibration image can be a silhouette image of the object. The generating of the second image can include determining a target pose of the object by mapping two dimensional (2D) keypoints to corresponding three dimensional (3D) points of depth data associated with the at least one calibration image, and generating the second image by warping the object in the at least one calibration image using a convolutional neural network that takes the at least one calibration image and the target pose of the object as input.

For example, the generating of the second image can include generating at least one part-mask in a first pass of a convolutional neural network having the at least one calibration image as an input, generating at least one part-image in the first pass of the convolutional neural network, and generating the second image a second pass of the convolutional neural network having the at least one part-mask and the at least one part-image as input. The generating of the second image can include using two passes of a convolutional neural network that is trained by minimizing at least two losses associated with warping the object. The second image can be blended using a neural network to generate missing portions of the second image. The second image can be a silhouette image of the object, the method further comprising merging the second image with a background image.

For example, the method can further include a pre-processing stage in which a plurality of images can be captured while the pose of the object is changed, storing the plurality of images as the at least one calibration image, generating a similarity score for each of the at least one calibration image based on a target pose, and selecting the at least one calibration image from the at least one calibration image based on the similarity score. The method can further include a pre-processing stage in which a plurality of images can be captured while the pose of the object is changed, storing the plurality of images as the at least one calibration image, capturing an image, during a communications event, the image including the object in a new pose, and adding the image to the stored plurality of images. In addition, a non-transitory computer-readable storage medium may have stored thereon computer executable program code which, when executed on a computer system, causes the computer system to perform a method according to any of the method claims. Also, an augmented reality (AR) and/or virtual reality (VR) system may comprise a sensor configured to capture color data and depth data and a processor configured to perform a method according to any of the method claims.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
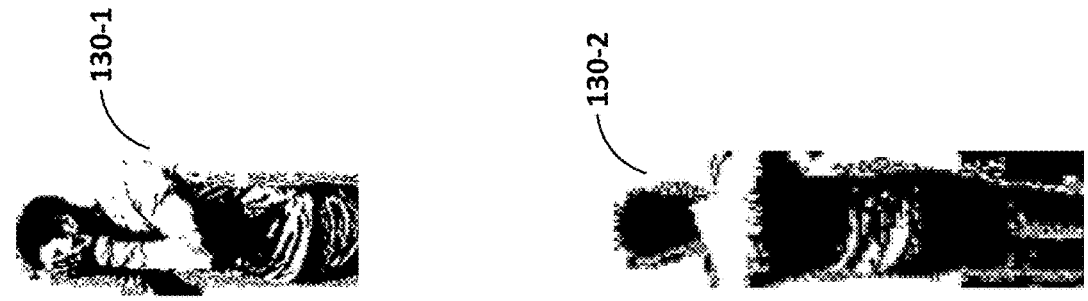
FIG. 1A illustrates a diagram of a system according to an example implementation.
Figure 1A:
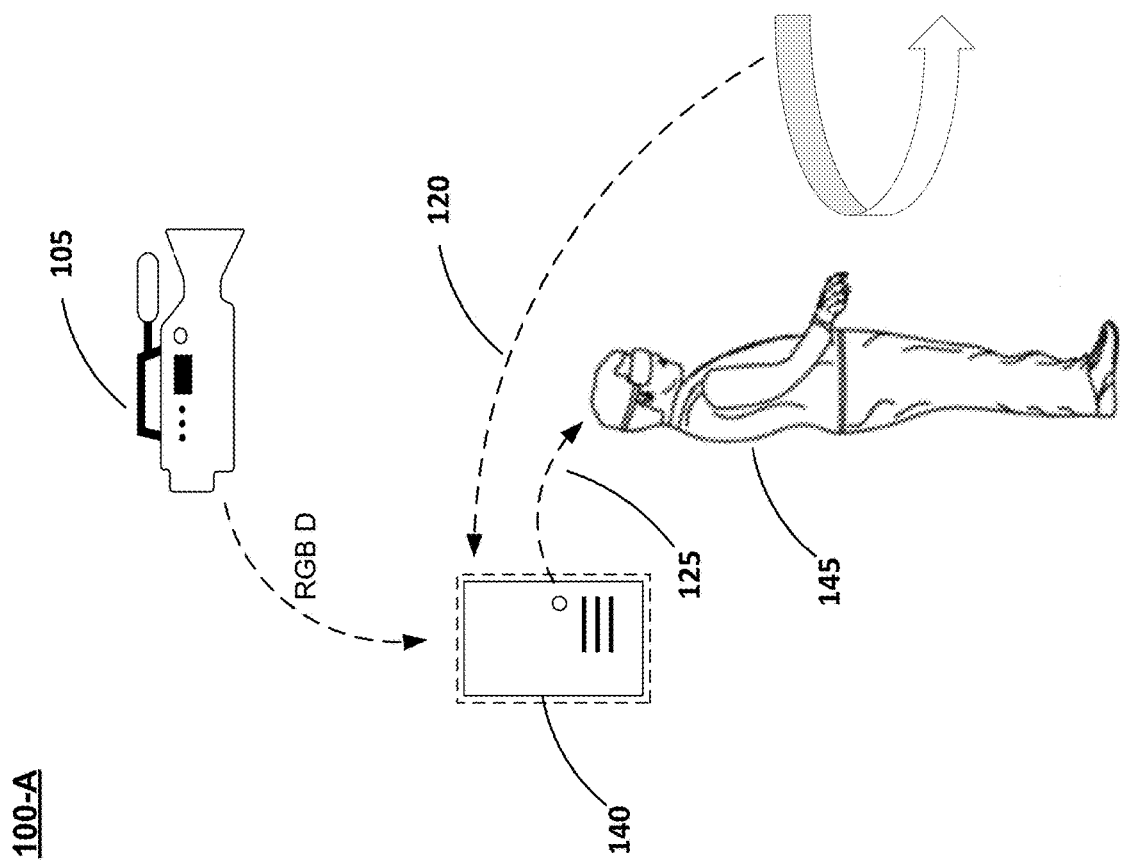

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Techniques used to capture and/or generate multi-view images for augmented reality (AR)/virtual reality (VR) (e.g., AR and/or VR) applications can be problematic in that they include expensive multi-view capture systems that can use complex capture rigs including several (4-8) calibrated RGBD sensors in order to generate very high-quality volumetric reconstructions necessary in AR and/or VR applications. For example, real-time capture and/or generate multi-view images may be possible, however the complications of setting up such a multi-view system and the associated cost remain high. Further, real time multi-view systems can also have reduced quality compared to their non-real time counterparts. Example implementations can solve the problem of these expensive systems by using a single camera (e.g., RGBD sensor) in AR and/or VR applications. The single camera can capture and store images, as calibration images, that can be used by AR and/or VR applications to generate high-quality volumetric reconstructions.

The technical solution can include determining a pose of an object (e.g., a user) captured by the single camera. One of the calibration images can then be selected based on the pose and a viewpoint. For example, a calibration image that includes the object in a pose that most closely (but not likely exactly) matches the determined pose at the viewpoint may be selected. The object in the calibration image is then warped to match the pose of the object in the captured image. The image (including the warped object and a background) is then output as the volumetric reconstruction. Further, an augmented reality (AR) and/or virtual reality (VR) system may comprise a sensor configured to capture color data and depth data as well as a processor configured to (i) determining a viewpoint associated with an augmented reality (AR) and/or virtual reality (VR) display displaying a second image, (ii) receiving at least one calibration image including an object in the first image, the object being in a different pose as compared to a pose of the object in the first image, and (iii) generating the second image based on the first image, the viewpoint and the at least one calibration image. The object in the at least one calibration image is warped to attain a different pose as compared to a pose of the object in the first image.

The use of the single camera with the calibration images can be beneficial in that the single camera can simplify (e.g., simplify setup and operation) AR and/or VR systems and make the AR and/or VR systems available to more users. Further, the use of the single camera with the calibration images can reduce the cost associated with the AR and/or VR systems. In other words, the benefit of example implementations can be the ability to use a multi-view setup to capture ground truth data, and to train a model that enables free viewpoint rendering using only a single RGBD sensor. The ability to render portions of an object (e.g., a human) that cannot be seen in the current view comes from previously captured calibration images and information associated with the object's shape (e.g., the human shape) and color learned by the model through training on multiple objects.

FIG. 1A illustrates a diagram of a system according to an example implementation. As shown in FIG. 1A, the system 100-A includes a camera 105, a server 140, a user 145, and a user 130. The system 100-A can be, at least, a portion of an augmented reality (AR) and/or virtual reality (VR) system. Therefore, the user 145 and the user 130 can be communicating using an AR and/or VR application. The user 130 can be communicating through use of the camera 105. The user 145 can be communicating via an AR and/or VR display (e.g., a head mount display (HMD), a display associated with a mobile device).

The camera 105 can capture image data, video data and/or video frame data (hereinafter image data) of the user 130 and communicate the image data to the server 140. The image data can include color (e.g., pixel) data and depth data. For example, the image data can be RGBD data. According to example implementations, a single (e.g., one) camera is 105 used. A camera can sometimes be called a sensor. Therefore, the camera 105 can be a single sensor (both a camera and a sensor may be referred to herein). The single camera 105 can be a conventional (e.g., readily available in commerce) camera configured to capture and communicate color data and depth data. The apparatus and methods associated with this system 100-A are advantageous over techniques that involved use of, for example, expensive multi-view capture rigs with several (4-8) calibrated RGBD sensors.

The camera 105 can be used to capture image(s) that are communicated to the server 140 and stored by the server 140. The image(s) can be called calibration image(s). The calibration image(s) can be captured as an initialization process (e.g., a pre-processing stage) of the AR and/or VR application.

The server 140 can be configured to use the calibration image(s) and/or the image data to generate and communicate modified image data 125 to the AR and/or VR display used by user 145. The user 130 can be in a first position and pose 130-1. The user 145 can move (e.g., virtually move) around the user 130 resulting in modified image data 125 being a rendering of the user 130 in a second position and pose 130-2 on the AR and/or VR display. The second position and pose 130-2 being different than the first position and pose 130-1. Accordingly, the server 140 can generate the modified image data 125 in response to receiving a viewpoint 120 associated with the AR and/or VR display.

In an example implementation, the camera 105 is in a fixed position. In other words, camera 105 does not move in response to the server 140 receiving the viewpoint 120. Accordingly, the server 140 can be configured to generate the modified image data 125 with the camera 105 in the fixed position. In other words, a rendered image can include at least one object (e.g., a human) in a different position and/or pose than the corresponding captured image.

In an example implementation, a viewpoint can refer to a virtual point from which the second image is to be observed.

A pose of an object can include information on the object's spatial orientation (and, possibly, on the relative position of different portions of the object). A calibration image can be an image that is captured and stored prior to generating the modified image. The calibration image can be filtered to remove a background so that the calibration only includes an object of interest (e.g., a video call participant) which is sometimes called a silhouette image. A plurality of calibration images can include images (and/or silhouette images) with the object of interest in different poses and viewpoints.

Figure 1B:
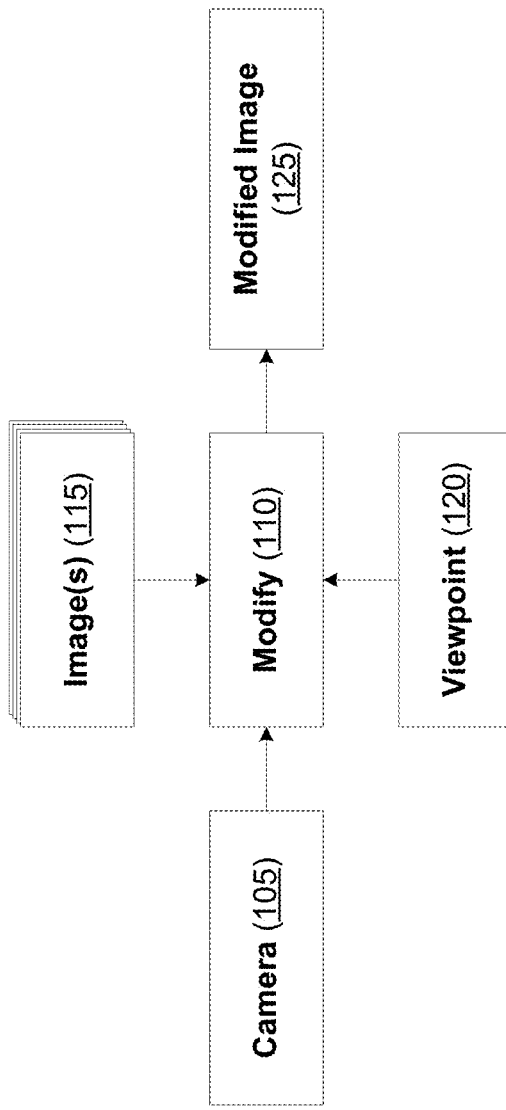
FIG. 1B illustrates a block diagram of a signal flow according to an example implementation.

FIG. 1B illustrates a block diagram of a signal flow according to an example implementation. As shown in FIG. 1B, the signal flow 100-B includes the camera 105, a modify block 110, image(s) block 115, the viewpoint 120 and a modified image 125. In FIG. 1B, modify block 110 receives image data from camera 105, images (or calibration images) from image(s) block 115 and the viewpoint associated with an AR and/or VR display from the viewpoint 120 and generates the modified image 125. In other words, the modified image 125 can be (generated) based on captured image data, stored image data (e.g., the calibration image(s)) and a viewpoint. The captured image data and the stored image data(e.g., the calibration image(s)) can be captured by a single camera (e.g., camera 105) which is advantageous over techniques that involved use of, for example, expensive multi-view capture rigs with several (4-8) calibrated RGBD sensors.

The modify block 110 can be program code stored in a memory of the server 140 which is executed by a processor of the server 140. The image(s) 115 can be at least one calibration image stored in a memory of server 140. The at least one calibration image can be captured using the camera 105 prior to initiating communication using an AR and/or VR application. The at least one calibration image can be captured using the camera 105 during a calibration process as an initial or first phase (or stage or step) after initiating communication using an AR and/or VR application. The at least one calibration image can be captured using the camera 105 while communicating using an AR and/or VR application (e.g., as a user moves, rotates, changes a position and/or changes a pose). Example implementations can utilize the at least one calibration image in place of images captured by a second (or multiple) cameras included in the expensive multi-view capture rigs with several (4-8) calibrated RGBD sensors.

Modify block 110 can modify an image (e.g., generate modified image 125) by selecting an image from image(s) 115 based on the image received from camera 105. An object (e.g., a human) in the selected image is warped based on the viewpoint 120, a position of the object in the captured image and a pose of the object in the captured image (sometimes called a position and pose). Warping (sometimes called distorting) an object of an image can include changing a position and pose of the object. Changing the position and pose if the object can include manipulating pixels (e.g., moving or mapping to a different location (x, y)) associated with the object in the image.

Therefore, according to example implementations AR and/or VR applications can generate high-quality volumetric reconstructions using a single camera and calibration images. For example, a device, a system, a non-transitory computer-readable medium (having stored thereon computer executable program code which can be executed on a computer system), and/or a method can implement a technique with a method including receiving a first image including color data and depth data, determining a viewpoint associated with an augmented reality (AR) and/or virtual reality (VR) display displaying a second image, receiving at least one calibration image including an object in the first image, the object being in a different pose as compared to a pose of the object in the first image, and generating the second image based on the first image, the viewpoint and the at least one calibration image. The object in the at least one calibration image is warped to attain a different pose as compared to a pose of the object in the first image.

Also, for example, the first image can be received from a single camera configured to capture the color data as red, green, blue (RGB) data and at least one of capture the depth data and generate the depth data based on the color data. The viewpoint associated with the AR and/or VR display can be different than a viewpoint associated with the first image. The at least one calibration image can be a silhouette image of the object. The generating of the second image can include determining a target pose of the object by mapping two dimensional (2D) keypoints to corresponding three dimensional (3D) points of depth data associated with the at least one calibration image, and generating the second image by warping the object in the at least one calibration image using a convolutional neural network that takes the at least one calibration image and the target pose of the object as input.

Also, for example, the generating of the second image can include generating at least one part-mask in a first pass of a convolutional neural network having the at least one calibration image as an input, generating at least one part-image in the first pass of the convolutional neural network, and generating the second image a second pass of the convolutional neural network having the at least one part-mask and the at least one part-image as input. The generating of the second image can include using two passes of a convolutional neural network that is trained by minimizing at least two losses associated with warping the object. The second image can be blended using a neural network to generate missing portions of the second image. The second image can be a silhouette image of the object, the method further comprising merging the second image with a background image.

Also, for example, the method can further include a pre-processing stage in which a plurality of images can be captured while the pose of the object is changed, storing the plurality of images as the at least one calibration image, generating a similarity score for each of the at least one calibration image based on a target pose, and selecting the at least one calibration image from the at least one calibration image based on the similarity score. The method can further include a pre-processing stage in which a plurality of images can be captured while the pose of the object is changed, storing the plurality of images as the at least one calibration image, capturing an image, during a communications event, the image including the object in a new pose, and adding the image to the stored plurality of images.

In a first stage, image data ($I_{cloud}$), a normal map (N), a pose ($x$), and a confidence (c) are generated from image data (I) captured by a camera ($\bar{v}$) (e.g., an RGBD image captured by camera 105). For example, a colored depthmap can be re-rendered from a viewpoint (v) to generate the image ($I_{cloud}$) and to generate the approximate normal map (N). In an example implementation, only the foreground of the image re-rendered by using a fast background subtraction technique that is based on depth and color (e.g., RGB). Further, the pose ($x$) of an object (e.g., a user of the VR/AR application) by generating keypoints in the coordinate frame of the viewpoint (v). Additionally, the confidence (c) (e.g., as a scalar value) can be determined by measuring the divergence between the viewpoints ($\bar{v}$, v). Equation 1 can represent this technique.

$$I_{cloud}, \varkappa, N, c = \mathcal{R}(\bar{I}, \bar{v}, v) \quad (1)$$

where,
$I_{cloud}$ is the image data,
N is the normal map,
$\varkappa$ is the pose,
c is a (scalar) confidence,
$\bar{I}$ is captured image data,
$\bar{v}$ is a viewpoint of the camera, and
v is a viewpoint of a AR and/or VR display.

Figure 2:
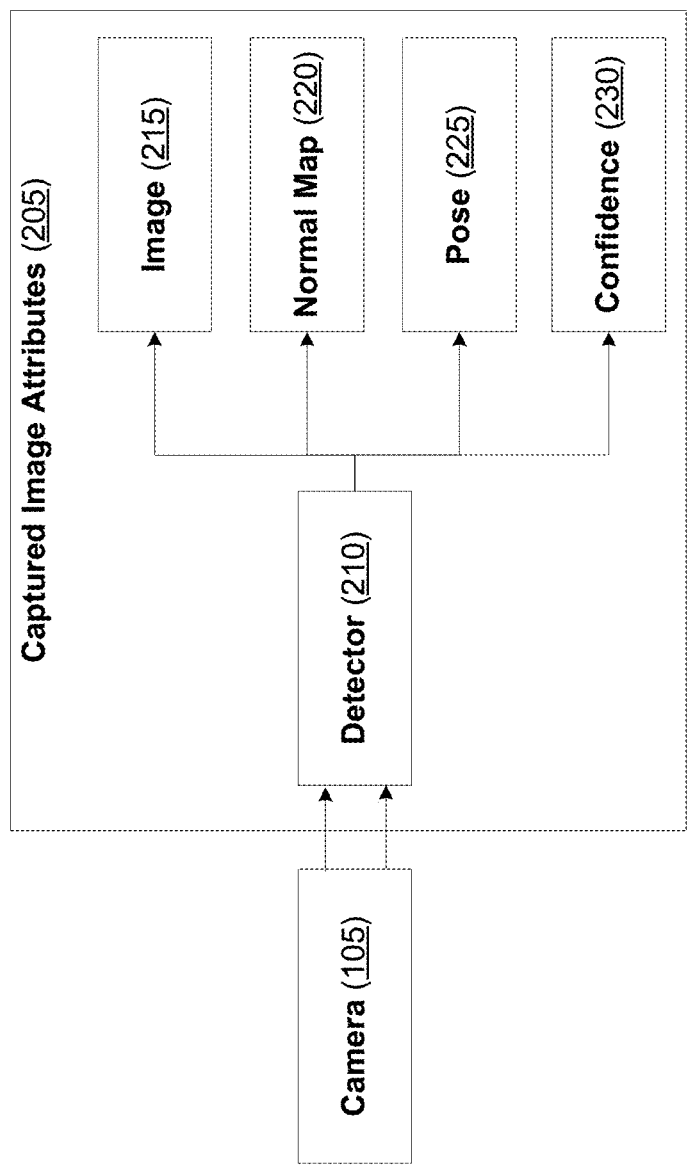
FIG. 2 illustrates a block diagram of a signal flow according to an example implementation.

FIG. 2 illustrates a block diagram of a signal flow according to an example implementation. The signal flow illustrated in FIG. 2 can be of an example implementation of the aforementioned first stage. As shown in FIG. 2, a captured image attribute 205 block includes a detector 210 block, an image 215 block, a normal map 220 block, a pose block 225, and a confidence 230 block. The detector 210 block receives image data from the camera 105. The image data can include color and data and depth data. In the signal flow of FIG. 2, a camera (e.g., camera 105) intrinsic parameters (optical center o and focal length f) are known. Therefore, the function $\Pi^{-1}(p, z|o, f)$: $\mathbb{R}^3 \to \mathbb{R}^3$ maps a 2D pixel p=(x, y) with associated depth z to a 3D point in the local camera coordinate frame.

The detector 210 can be configured to generate the image 215, the normal map 220, the pose 225 and the confidence 230 based on the image data received from camera 105. In an example implementation, image 215 can be rendered from the image data using the function $\Pi^{-1}$.

To do so, the depth channel of $\bar{I}$ is converted into a point cloud of size M in matrix form as $\bar{P} \in \mathbb{R}^{4 \times M}$. The point cloud is then rotated and translated into a novel viewpoint coordinate frame as $P = T\bar{P}$, where $T = \mathbb{R}^{4 \times 4}$ and is a homogeneous transformation representing the relative transformation between $\bar{v}$ and v. P is then rendered to a two-dimensional (2D) image $I_{cloud}$ by inserting each point with a 3×3 kernel to reduce re-sampling artifacts. Inserting each point is sometimes called point-based rendering or splatting (e.g., using a function call in OpenGL).

In an example implementation, the detector 210 can detect the pose ($\varkappa$) of the object (e.g., the user) by determining (e.g., calculating, computing, and/or the like) 2D keypoints as $\bar{\varkappa}_{2D} = K_v(\bar{I})$ where K is a pre-trained feed-forward network. 2D keypoints can then be mapped to their 3D counterparts $\bar{\varkappa}$ by using the depth channel of $\bar{I}$ and transform the keypoints in the camera coordinate frame v as $\varkappa$. Missing keypoints can be extrapolated based on object features. For example, if the object is a human, keypoints can be extrapolated based on a rigidity of the limbs, torso and/or face.

In some implementations, extrapolating keypoints may fail. In this situation the current image (e.g., as a frame of a video) can be discarded and a previous pose ($\varkappa$) is used. In some implementations, in order to use (e.g., to communicate data if necessary) the keypoints in the pose ($\varkappa$) in the the networks of equations (3) and (4), described below, each point in the image $I_{cloud}$ channel (e.g., a grayscale image of the image) can be encoded as a Gaussian centered around the point with a fixed variance.

In an example implementation, the detector 210 can generate a normal map 220 (or N). The normal map can be used to determine whether a pixel in the image data ($\bar{I}$) can be observed sufficiently in reference to the viewpoint of the camera $\bar{v}$. The normal map can be generated using the techniques used to generate the image data ($I_{cloud}$) described above. The normal map (N) color components (e.g., RGB) can correspond to the x, y, z coordinates of the surface normal.

In an example implementation, the detector 210 can generate a confidence 230 (or c). confidence (c) can be determined (e.g., calculated, computed, and/or the like) as the dot product between the cameras view vectors: $c = [0, 0, 1] \cdot r_z / \|r_z\|$, where the viewpoint of the camera ($\bar{v}$) is assumed to be the origin and $r_z$ is the third column of the rotation matrix for the viewpoint of the AR and/or VR display (v). The relationship between $\bar{v}$ and v, as a function of c, can be used to infer whether the viewpoint of the AR and/or VR display v is back-facing (c<0) or front-facing (c>0).

In a pre-processing (e.g., before the first) stage, a set of calibration images $\{\bar{I}_{calib}^n\}$ can be captured and stored. The calibration images can be taken of the object (e.g., the user) in any number of poses and/or positions $\{\bar{\varkappa}_{calib}^n\}$. For example, the AR and/or VR application can include a routine configured to instruct the object (e.g., the user) to move, rotate, change position, change pose, and/or the like in front of the camera (e.g., camera 105) before the AR and/or VR communication starts. Example implementations may not capture a set of calibration images $\{\bar{\varkappa}_{calib}^n\}$ large enough to contain the object in every possible pose that could be observed from viewpoint of the AR and/or VR display v. However, the set of calibration images $\{\bar{\varkappa}_{calib}^n\}$ can include a sufficient number of images to extrapolate the appearance of the object from most, if not all, possible viewpoints of the AR and/or VR display (v).

According to an example embodiment, an image that best resembles the in the new, target or desired pose ($\varkappa$) in the viewpoint of the AR and/or VR display (v) can be selected from the set of calibration images and poses $\{\bar{I}_{calib}^n, \bar{\varkappa}_{calib}^n\}$. Equation 2 can represent this technique.

$$\bar{I}_{calib}, \bar{\varkappa}_{calib} = S(\{\bar{I}_{calib}^n, \bar{\varkappa}_{calib}^n\}, \varkappa) \quad (2)$$

where,
$\bar{I}_{calib}$ is the calibration image,
$\bar{\varkappa}_{calib}$ is the calibration image pose,
$\bar{I}_{calib}^n$ is the set of calibration images,
$\bar{\varkappa}_{calib}^n$ is the set of calibration image poses, and
$\varkappa$ is the target or desired pose.

Figure 3:
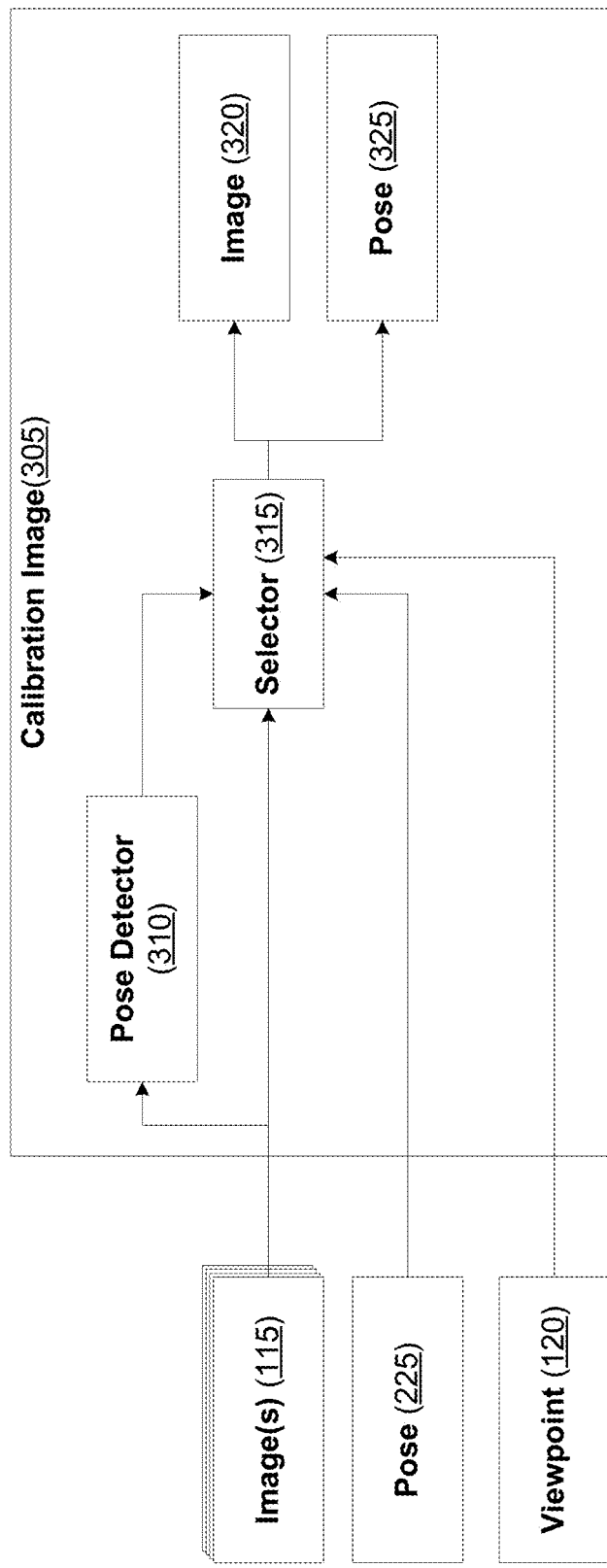
FIG. 3 illustrates another block diagram of a signal flow according to an example implementation.

FIG. 3 illustrates a block diagram of a signal flow according to an example implementation. The signal flow illustrated in FIG. 3 can be of an example the implementation of selecting a calibration image stored during the aforementioned pre-processing stage. As shown in FIG. 3, a calibration image 305 block includes a pose detector 310 block, a selector 315 block, an image block and a pose 325 block. The selector 315 block uses the image(s) 115 block, the pose 225 block, the viewpoint 120 block and the pose detector 310 block as input. Further, the pose detector 310 block uses the image(s) 115 block as input.

The pose detector 310 is configured to detect a pose of each calibration image (e.g., each of the set of calibration images $\{\bar{I}_{calib}^n\}$) received from the image(s) 115 block. Each pose is sent to the selector 315 block and associated with it's corresponding image of the image(s) 115. The selector 315 block uses the pose corresponding to each image of the image(s) 115, pose 225 and viewpoint 120 to select one of the image(s) 115 as the calibration image ($\bar{I}_{calib}$).

The selected image can be the image that has the pose that most closely matches pose 225 at the viewpoint 120. In other words, the selected image can be the image that when warped using equation (3), see below, can provide sufficient information to equation (4), see below, to produce the image to be displayed on the VR/AR display. Image 320 can be the calibration image ($\bar{I}_{calib}$) and the pose for the selected the calibration image ($\bar{I}_{calib}$) as determined by the pose detector 310 can be the pose 325.

A score for each of the image(s) 115 can be determined (e.g., calculated, computed, and/or the like). In an example implementation, the image with the highest score can be selected as the calibration image. Alternatively, the image with the lowest score can be selected as the calibration image. Alternatively, the image with a score that satisfies some criterion (e.g., equal to or above a threshold number, below a threshold number, and the like) can be selected as the calibration image. The score can be calculated based on weighted scores for elements of the object. For example, the score for an object that is a human can be computed as follows:

$$S^n = \omega_{head} S_{head}^n + \omega_{torso} S_{torso}^n + \omega_{sim} S_{sim}^n \qquad (5)$$

where, $\omega_{head}$ is a weight variable for a head score,
$S_{head}^n$ is the head score,
$\omega_{torso}$ is a weight variable for a torso score,
$S_{torso}^n$ is the torso score
$\omega_{sim}$ is a weight variable for a similarity score, and
$S_{sim}^n$ is the similarity score.

A 3D unit vector representing the forward-looking direction of the user's head can be computed using the 3D keypoints k. The vector can be computed by creating a local coordinate system from the keypoints of the eyes and nose. 3D unit vectors $\{d_{calib}^n\}$ can be determined (e.g., calculated, computed, and/or the like) from the calibration images keypoints $\{\bar{k}_{calib}^n\}$. The head score can be determined (e.g., calculated, computed, and/or the like) as the dot product $S_{head}^n = d \cdot d_{calib}^n$, and a similar process can be used to determine (e.g., calculate, compute, and/or the like) $S_{torso}^n$, where the coordinate system can be created from the left/right shoulder and the left hip keypoints.

These two scores are already sufficient to accurately select a calibration image from the desired novel viewpoint. However, they do not take into account the configuration of the limbs. Therefore, $S_{sim}^n$ can be used to determine (e.g., calculate, compute, and/or the like) a similarity score between the keypoints $\bar{k}_{calib}^n$ in the calibration images to those in the new, target or desired pose ($\varkappa$).

In order to simplify the notation, $\hat{k}$ and $\hat{k}_{calib}^n$ can be referred to as the image-space 2D coordinates of keypoints in homogeneous coordinates. A similarity transformation (rotation, translation, scale) $T_n \in \mathbb{R}^{3 \times 3}$ that can align the two sets can be determined (e.g., calculated, computed, and/or the like). In an example implementation, at least 2 points may be needed to estimate a 4 degrees of freedom (DOF) transformation (e.g., one for rotation, two for translation, and one for scale). Therefore, arm keypoints (elbow, wrist) and leg keypoints (knee, foot) can be grouped together. For example, all the keypoints belonging to the left arm group (LA) can be calculated as:

$$\underset{T_n^{LA}}{\operatorname{argmin}} \sum_{LA} \left\| \hat{k}^{LA} - T_n^{LA} \hat{k}_{calib}^{n,LA} \right\|^2 \qquad (6)$$

where, $\hat{k}^{LA}$ are the detected, left arm keypoints for the current view,
$\hat{k}_{calib}^{n,LA}$ are the detected left arm keypoints for the calibration images, Keypoints are expressed in 3D homogeneous coordinates (4×1 vectors), and The transformation $T_n^{LA}$ is a 4×4 matrix that is applied to roto-translate each keypoint from the calibration image to the current view.

The similarity score can be defined as:

$$S^{LA} = \exp(-\sigma \| \hat{k} - T_n^{LA} \hat{k}_{calib}^{n,LA} \|) \qquad (7)$$

where, $\sigma$ is a scaling factor, and
all the other quantities are defined above.

The final $S_{sim}^n$ can be the sum of the scores for elements of the object (e.g., the four (4) limbs) (indexed by j). The weights $\omega_j$ can be adjusted to give more importance to head and torso directions, which can define the desired target viewpoint. The calibration image ($\bar{I}_{calib}$) with the respective pose $\bar{\varkappa}_{calib}$ and with the highest score $\overline{S}$ can be selected as the calibration image (e.g., by selector 315).

The selected calibration image ($\bar{I}_{calib}$) should have a similar viewpoint to the viewpoint 120 associated with the AR and/or VR display (v). However, the pose $\bar{\varkappa}_{calib}$ could be different from the desired pose ($\varkappa$). In other words, the set of calibration images ($\{\bar{I}_{calib}^n\}$) is unlikely to include an image at the desired pose ($\varkappa$). Therefore, the selected calibration image ($\bar{I}_{calib}$) can be warped to generate an image equivalent to a silhouette of the object ($I_{warp}$) (e.g., a silhouette image or part-image) and a silhouette mask (or part-mask) of the object in the desired pose ($I_{warp}^*$). According to an example implementation, a convolutional neural network can be used to warp the selected calibration image ($\bar{I}_{calib}$).

According to an example implementation, a calibration image $\bar{I}_{calib}$ can be selected (e.g., from the set of calibration images $\{\bar{I}_{calib}^n\}$). A neural network W with learnable parameters $\omega$ can warp the selected image into the desired pose ($\varkappa$) based on an object pose $\bar{\varkappa}_{calib}$. Substantially simultaneous a silhouette mask (or part-mask) of the object in the desired pose ($\varkappa$)($I_{warp}^*$) can be generated. Equation 3 can represent this technique.

$$I_{warp}, I_{warp}^* = W_\omega(\bar{I}_{calib}, \bar{\varkappa}_{calib}, \varkappa) \qquad (3)$$

where, $I_{warp}$ is a silhouette of the object in the desired (new or target) pose,
$I_{warp}^*$ is a silhouette mask of the object in the desired (new or target) pose,
$W_\omega$ is a neural network W with learnable parameters $\omega$),
$\bar{I}_{calib}$ is a calibration image,
$\bar{\varkappa}_{calib}$ is an object pose, and
$\varkappa$ is a desired pose.

Figure 4:
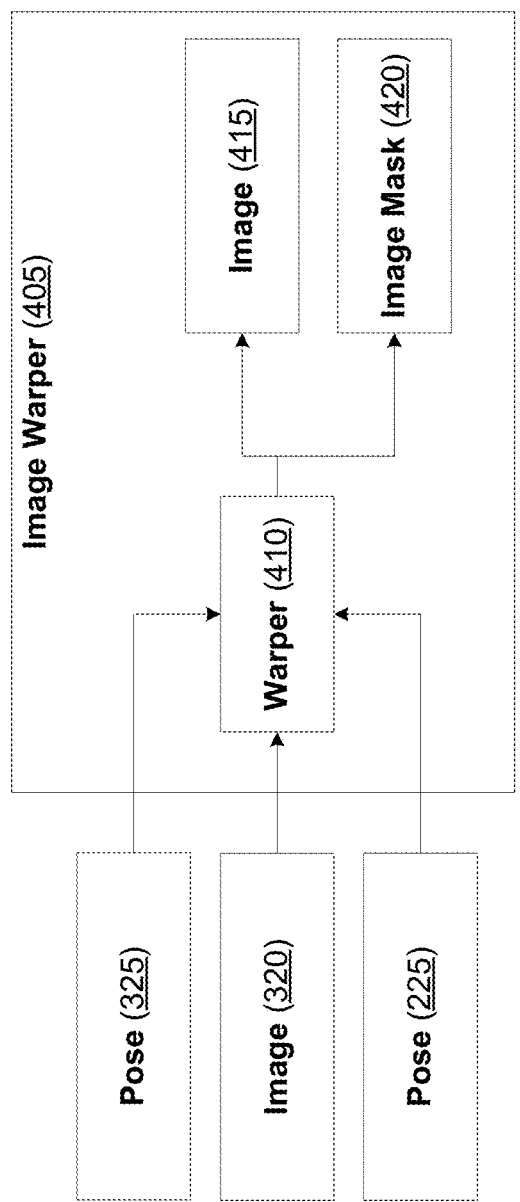
FIG. 4 illustrates still another block diagram of a signal flow according to an example implementation.

FIG. 4 illustrates still another block diagram of a signal flow according to an example implementation. The signal flow illustrated in FIG. 4 can be of an example the implementation of warping a calibration image. As shown in FIG. 4, an image warper 405 block includes a warper 410 block, an image block 415 and an image mask 420. The warper 410 block uses the pose 325, the image 320 and the pose 225 as input. In an example implementation, the warper 410 generates the image 415 and the image mask 420 based on the pose 325, the image 320 and the pose 225.

The warper 410 can use a convolutional neural network to generate the image 415 as the silhouette of the object (e.g., a silhouette image or part-image) in the desired pose ($I_{warp}$) based on image 320 as the calibration image ($\bar{I}_{calib}$), the pose 325 as the pose of an object in the image 320 ($\bar{\varkappa}_{calib}$), and the pose 225 as the target or desired pose ($\varkappa$). Further, the warper 410 can use the convolutional neural network to generate the image mask 420 as the silhouette mask (or part-mask) of the object in the desired pose ($I_{warp}^*$) based on the image 320 as the calibration image ($I_{calib}$), the pose 325 as the pose of an object in the image 320 ($\bar{\varkappa}_{calib}$), and the pose 225 as a target or desired pose ($\varkappa$).

In an example implementation, the pose of an object in the image 320 also called the calibration pose ($\bar{\varkappa}_{calib}$) can be a tensor having 17 channels or one channel per keypoint. The calibration pose ($\bar{\varkappa}_{calib}$) tensor and the calibration image ($I_{calib}$) can go through a first pass of the convolutional neural network (e.g., based on the U-NET model) to produce output part masks ($I_{part,p}^*$) and a background mask ($I_{bg}^*$). These masks can select which regions of the object (e.g., body) should be warped according to a similarity transformation. The warping transformations may not be learned. Instead, the warping transformations can be determined (e.g., calculated, computed, and/or the like) using equation 6 on keypoint groups of at least two 2D points.

In an example implementation, a warped texture ($I_{warp,p}$) can have three (3) RGB channels for each keypoint group p (30 channels in total). However, the masks are not used just to select pixels to be warped. Instead, the masks can be used to warp the object element (e.g., body part) masks themselves to the target or desired pose ($\varkappa$). The maximum across all the channels can be used to supervise the generation (or synthesis) of the resulting warped silhouette ($I_{part,warp}$) (e.g., a warped silhouette image). Using the masks to warp the object element (e.g., body part) masks can avoid or minimize overfitting, can teach the network to transfer the texture from the calibration image to the target view and keep high frequency details.

Further, in example implementations, the background (or background image) may not be generated. In other words, only the object (e.g., human) is warped. However, a background mask ($I_{bg}^*$) is predicted. The warped silhouette a ($I_{part,warp}$) (e.g., a silhouette image or part-image) and the warped texture ($I_{warp,p}$) can go through a second pass of the convolutional neural network (e.g., based on the U-NET model) to merge the per-part textures and refine the final foreground mask.

In an example implementation the warper 410 (e.g., the convolutional neural network) can be trained to minimize multiple losses as detailed in equation 8:

$$\mathcal{L}_{warp} = w_{rec}^w \mathcal{L}_{rec}^w + w_{fg}^w \mathcal{L}_{fg}^w + w_{bg}^w \mathcal{L}_{bg}^w + w_{fgref}^w \mathcal{L}_{fgref}^w + w_{GAN}^w \mathcal{L}_{GAN}^w \quad (8)$$

where the weights $w^{*w}$ are empirically chosen such that all the losses are approximately in the same dynamic range. The remaining variables are discussed in detail below.

Warp reconstruction loss ($\mathcal{L}_{rec}^w$) is a perceptual reconstruction loss. $\mathcal{L}_{rec}^w = \|VGG(I_{warp}) - VGG(I_{gt})\|_2$ can measure the difference in a deep convolutional neural network (e.g., a visual geometry group (VGG) network) for object recognition feature-space between the predicted image $I_{warp}$, and the corresponding groundtruth image $I_{gt}$. Given the nature of calibration images, $I_{warp}$ may lack high frequency details such as facial expressions. Therefore, we compute the loss selecting features from conv2 up to conv5 layers of the deep convolutional neural network.

Warp background loss ($\mathcal{L}_{bg}^w$) is a background noise. In order to remove the background noise components, a loss $\mathcal{L}_{bg}^w = \|I_{bg}^* - I_{bg,gt}^*\|_1$ between the predicted mask $I_{bg}^*$ and the groundtruth mask $I_{bg,gt}^* = 1 - I_{gt}^*$.

Warp foreground loss ($\mathcal{L}_{fg}^w$) is a foreground noise. Each part mask can be warped into target or desired pose ($\varkappa$) by a corresponding similarity transformation. Channels can be merged with a max-pooling operator, and retrieve a foreground mask ($\bar{I}_{part,warp}^*$), over which we impose the loss $\mathcal{L}_{fg}^w = \|\bar{I}_{part,warp}^* - I_{gt}^*\|_1$. The warp foreground loss ($\mathcal{L}_{fg}^w$) can push the network towards learning transformation rather than memorizing the solution (e.g., overfitting).

Warp foreground refinement loss $\mathcal{L}_{fgref}^w$ is a loss due to match errors. The warped part masks $I_{part,p}^*$ may not match the silhouette (e.g., a silhouette image or part-image) precisely due to the assumption of similarity transformation among the object elements (e.g., body parts). Therefore, the mask can be modified to produce a final binary image $I_{warp}^*$. This can be trained by minimizing the loss $\mathcal{L}_{fgref}^w = \|I_{warp}^* - I_{gt}^*\|_1$.

Warp GAN loss $\mathcal{L}_{GAN}^w$ is loss due to the neural network. A generative adversarial network (GAN) component can be added to help generate missing portions (sometimes called hallucinating) of realistic high frequency details. The GAN component can cause a more stable result as compared to not using the GAN component: $\mathcal{L}_{GAN}^w = -\log(D(I_{warp}^*))$, where a discriminator D consists of 5 cony layers with 256 filters, with max pooling layers to downsample the feature maps. Two (2) fully connected layers with 256 features and a sigmoid activation can be added to produce a discriminator label.

The re-rendered image ($I_{cloud}$) can be enhanced by the content in the warped calibration image ($I_{warp}$) using a neural blending operation including use of another convolutional neural network. The convolutional neural network should favor details from the re-rendered image ($I_{cloud}$) if the viewpoint of the AR and/or VR display (v) is close to the viewpoint of the camera $\bar{v}$, while it should leverage the texture in the warped calibration image ($I_{warp}$) for back-facing views.

The information captured by the traditional re-rendering described by equation 1 can be blended to the warped calibration image of equation 3 to produce a final image ($I_{out}$) as:

$$I_{out} = \mathcal{B}_\beta(I_{cloud}, I_{warp}, I_{warp}^*, N, c) \quad (4)$$

Figure 5:
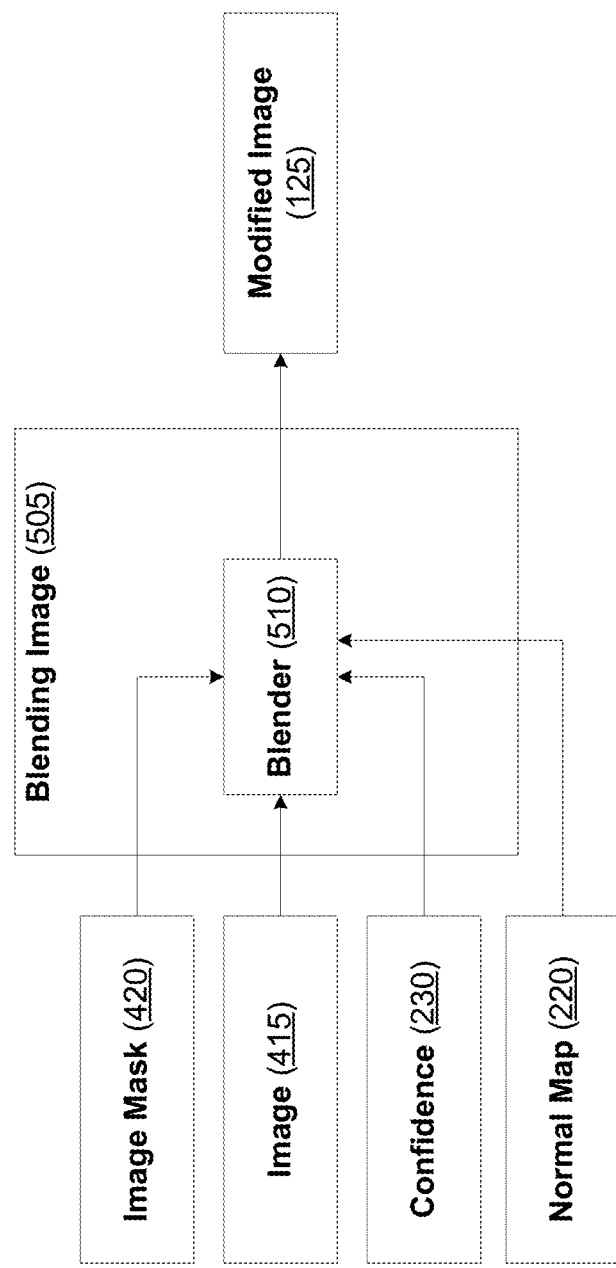
FIG. 5 illustrates yet another block diagram of a signal flow according to an example implementation.

FIG. 5 illustrates a block diagram of a signal flow according to an example implementation. The signal flow illustrated in FIG. 5 can be of an example an implementation of blending to generate (or synthesize) a final image. As shown in FIG. 5, a blending image 505 block includes a blender 510 block. The blender 510 block uses the image mask 420, the image 415, the confidence 230 and the normal map 220 as input. In an example implementation, the blender 510 block generates the modified image 125 based on the image mask 420, the image 415, the confidence 230 and the normal map 220.

The normal map N, and the confidence c are input to a convolutional neural network as an extra channel to each pixel. The additional channels contain the information used to disambiguate a frontal view(s) from a back view(s). The mask ($I_{warp}^*$) is used as an additional feature to guide the convolutional neural network towards understanding where the network should generate missing portions (sometimes called hallucinating) of image content not visible in the re-rendered image ($I_{cloud}$).

The blender 510 can be supervised by the following loss:

$$\mathcal{L}_{blender} = w_{rec}^B \mathcal{L}_{rec}^B + w_{GAN}^B \mathcal{L}_{GAN}^B \quad (9)$$

where, $\mathcal{L}_{rec}^B$ is blender reconstruction loss, and $\mathcal{L}_{GAN}^B$ is blender GAN loss.

For blender reconstruction loss ($\mathcal{L}_{rec}^B$) the reconstruction loss computes the difference between the final image output ($I_{out}$) and the target view ($I_{gt}$). Blender reconstruction loss ($\mathcal{L}_{rec}^{\mathcal{B}}$) can be defined by $\mathcal{L}_{rec}^{\mathcal{B}}=\|\text{VGG}(I_{out})-\text{VGG}(I_{gt})\|_2 + w_{l_1}\|I_{out}-I_{gt}\|_1$. A small ($w_{k_1}$=0.01) photometric ($l_1$) loss can be used to ensure rapid color convergence.

Blender GAN loss ($\mathcal{L}_{GAN}^{\mathcal{B}}$) can be loss due to the neural network. A generative adversarial network (GAN) component can be added to help generate missing portions (sometimes called hallucinating) of realistic high frequency details. The GAN component can cause a more stable result as compared to not using the GAN component: $\mathcal{L}_{GAN}^{\mathcal{B}}=-\log(D(I_{blend}))$, where a discriminator D consists of 5 conv layers with 256 filters, with max pooling layers to downsample the feature maps. Two (2) fully connected layers with 256 features and a sigmoid activation can be added to produce a discriminator label.

FIGS. 6-10 are flowcharts of methods according to example embodiments. The methods described with regard to FIGS. 6-10 may be performed due to the execution of software code stored in a memory (e.g., a non-transitory computer readable storage medium) associated with an apparatus (e.g., server 140) and executed by at least one processor associated with the apparatus.

However, alternative embodiments are contemplated such as a system embodied as a special purpose processor. The special purpose processor can be a graphics processing unit (GPU). A GPU can be a component of a graphics card. The graphics card can also include video memory, random access memory digital-to-analogue converter (RAMDAC) and driver software. The video memory can be a frame buffer that stores digital data representing an image, a frame of a video, an object of an image, or scene of a frame. A RAMDAC can be configured to read the contents of the video memory, convert the content into an analogue RGB signal and sends analog signal to a display or monitor. The driver software can be the software code stored in the memory referred to above. The software code can be configured to implement the method described below (and/or the components, modules and signal flows described above).

Although the methods described below are described as being executed by a processor and/or a special purpose processor, the methods are not necessarily executed by a same processor. In other words, at least one processor and/or at least one special purpose processor may execute the method described below with regard to FIGS. 6-10.

Figure 6:
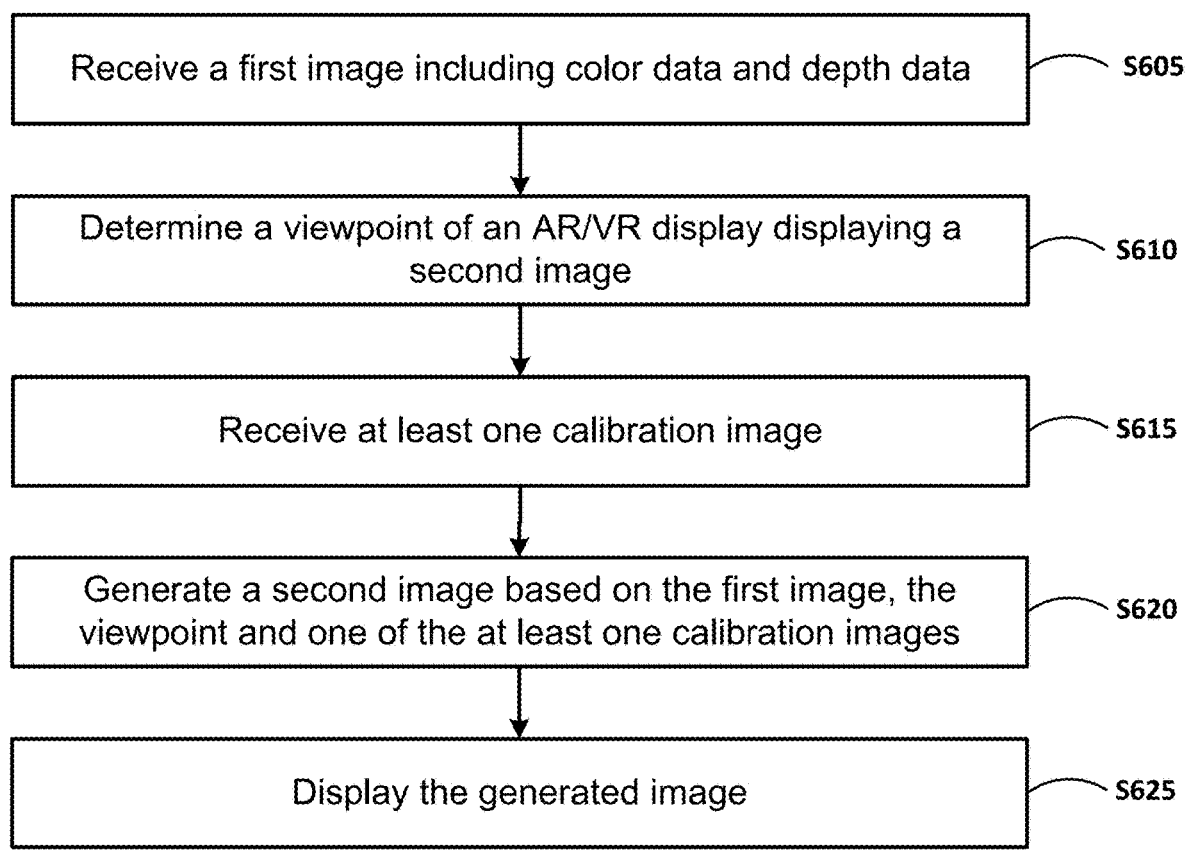
FIG. 6 illustrates a method for generating an image according to an example implementation.

FIG. 6 illustrates a method for generating an image according to an example implementation. As shown in step S605, a first image including color data and depth data is received. For example, the first image can be received from a camera (e.g., camera 105). The first image can be received at a computing device (e.g., server 140). The first image can be communicated via a wired and/or wireless communications system (e.g., during a communications event). The first image can be image data including color data (e.g., RGB) and depth data. For example, the camera can include a sensor to capture image data and depth data. Alternatively, or in addition, the camera can include a sensor to capture image data and processing capabilities that can generate depth data from the image data.

In step S610 a viewpoint of an AR and/or VR display displaying a second image is determined. For example, the AR and/or VR display (e.g., a HIVID) can detect a viewpoint of a user viewing the AR and/or VR display. The viewpoint can be detected base on a position and/or a change in position of the AR and/or VR display and/or a viewing direction of the eyes of the user viewing the AR and/or VR display. Data (e.g., coordinates) representing the viewpoint of the user viewing the AR and/or VR display can be received at the computing device (e.g., server 140). The data representing the viewpoint of the user viewing the AR and/or VR display can be communicated via a wired and/or wireless communications system (e.g., during a communications event).

In step S615 at least one calibration image is received. For example, a calibration image can be captured using the camera (e.g., camera 105) during a calibration process as an initial or first phase (or stage or step) after initiating communication using an AR and/or VR application. The calibration image can be captured using the camera 105 while communicating using an AR and/or VR application (e.g., as a user moves, rotates, changes a position and/or changes a pose). A plurality of the calibration images can be captured and stored in memory (e.g., a memory of server 140, a library on the server 140). Accordingly, the calibration image can be read from the memory. In an example implementation, the calibration image is selected from the plurality of calibration images.

In step S620 a second image is generated based on the first image, the viewpoint and one of the at least one calibration images. For example, the calibration image can be modified based on the viewpoint and the first image. In an example implementation, an object (e.g., a human) in the calibration image can be modified based on the viewpoint and a same object in the first image. The calibration image can be modified by warping the object in the second image based on a pose of the object in the first image and the viewpoint. In other words, the object is in a different position and pose as compared to a position and pose of the object in the first image.

In step S625 the generated image is displayed. For example, after the second image is generated, the second image can be rendered on the AR and/or VR display. As a result, the viewer of the AR and/or VR display sees the object based on intentional movement of the viewer even though the camera has captured an image with the object in a different pose and position than the viewer intends. In other words, the viewer can view the back of the object even though the front of the object was captured by the camera. In an example implementation, the second image can be merged with a background image.

Figure 7:
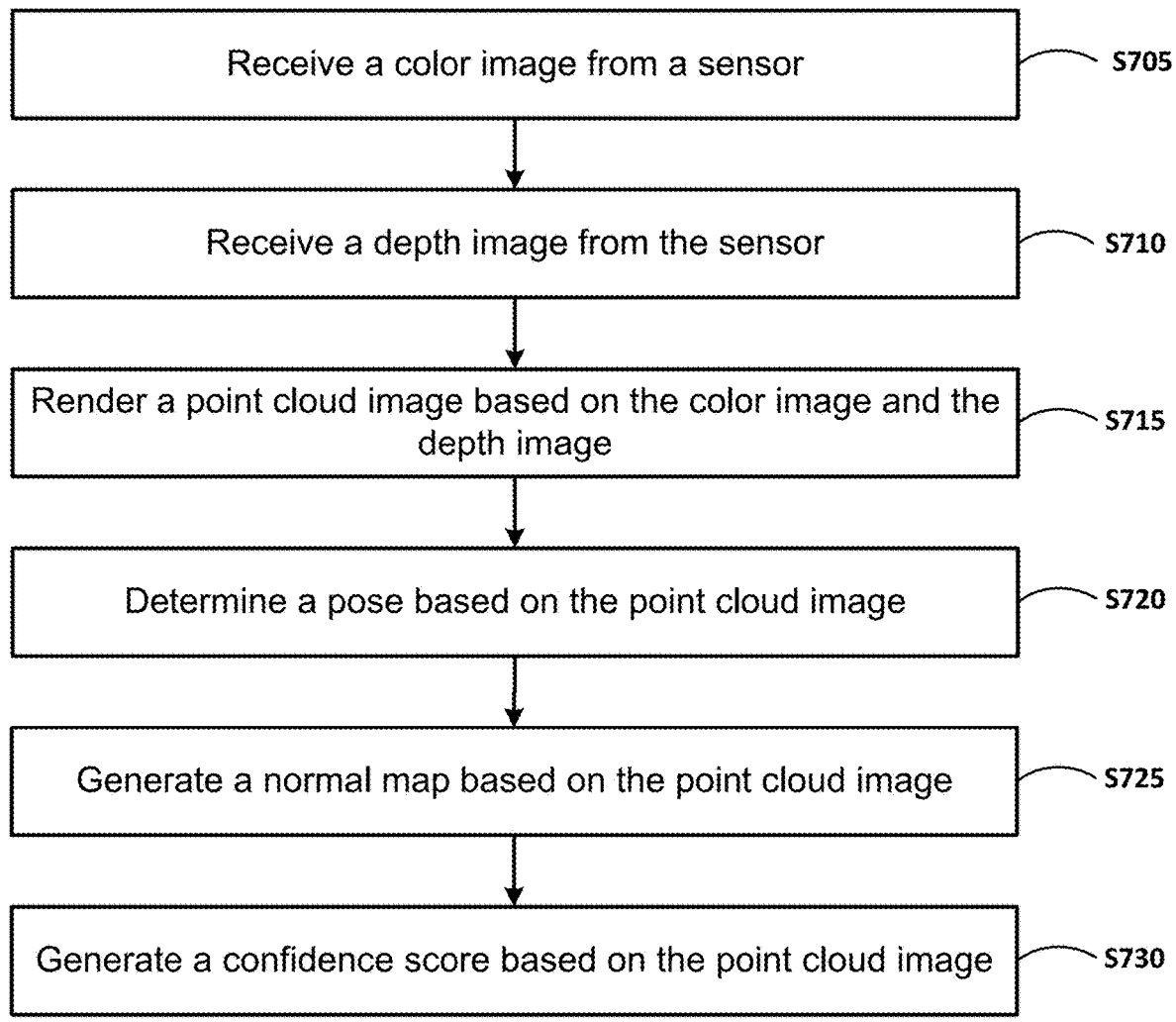
FIG. 7 illustrates a method for generating a normal map according to an example implementation.

FIG. 7 illustrates a method for generating a normal map according to an example implementation. As shown in step S705, a color image is received from a sensor. For example, the color image can be received from a sensor (e.g., camera 105). The color image can be received at a computing device (e.g., server 140). The color image can be communicated via a wired and/or wireless communications system (e.g., during a communications event). The color image can be image data including color data (e.g., RGB). For example, the sensor can be configured to capture image data.

In step S710, a depth image is received from the sensor. For example, the depth image can be received from a sensor (e.g., camera 105). The depth image can be received at a computing device (e.g., server 140). The depth image can be communicated via a wired and/or wireless communications system (e.g., during a communications event). The depth image can be depth data. For example, the sensor can be configured to capture image data and depth data. Alternatively, or in addition, a camera including the sensor can include processing capabilities that can generate depth data from the image data.

In step S715, a point cloud image is rendered based on the color image and the depth image. For example, the color image and the depth image can include an object. The object can be re-rendered (e.g., as a silhouette of the object) as the point cloud image. The object can be a re-rendering of the depth image. The object can be a re-rendering of the color image. The object can be re-rendered as a 2D image. The object can be rotated and translated. The point cloud image can be resized (e.g., based on a size of an image to be generated in a future process step).

In step S720, a pose is determined based on the point cloud image. For example, 2D keypoints can be determined (e.g., calculated, computed, and/or the like) from the color image and/or depth image. For example, the 2D keypoints can be a small (e.g., 20, 30, 40, and the like) number of points that have coordinates along the object. The 2D keypoints can be mapped to corresponding points in the depth image. In some implementations, missing corresponding points can be extrapolated. The pose can be determined by encoding each of the corresponding points as a Gaussian centered the point with a fixed variance.

In step S725, a normal map is generated based on the point cloud image. The normal map can be used to determine whether a pixel in the image data can be observed sufficiently in reference to the viewpoint of the camera. The normal map color components (e.g., the color image or RGB) can correspond to the x, y, z coordinates of the surface normal.

In step S730, a confidence score is generated based on the point cloud image. For example, the confidence (e.g., as a scalar value) can be determined (e.g., calculated, computed, and/or the like) by measuring the divergence between the viewpoint of the camera and a viewpoint of an AR and/or VR display. In an example implementation, the confidence score can be determined as the dot product between a vector corresponding to the viewpoint of the camera and a vector corresponding to the viewpoint of the AR and/or VR display.

Figure 8:
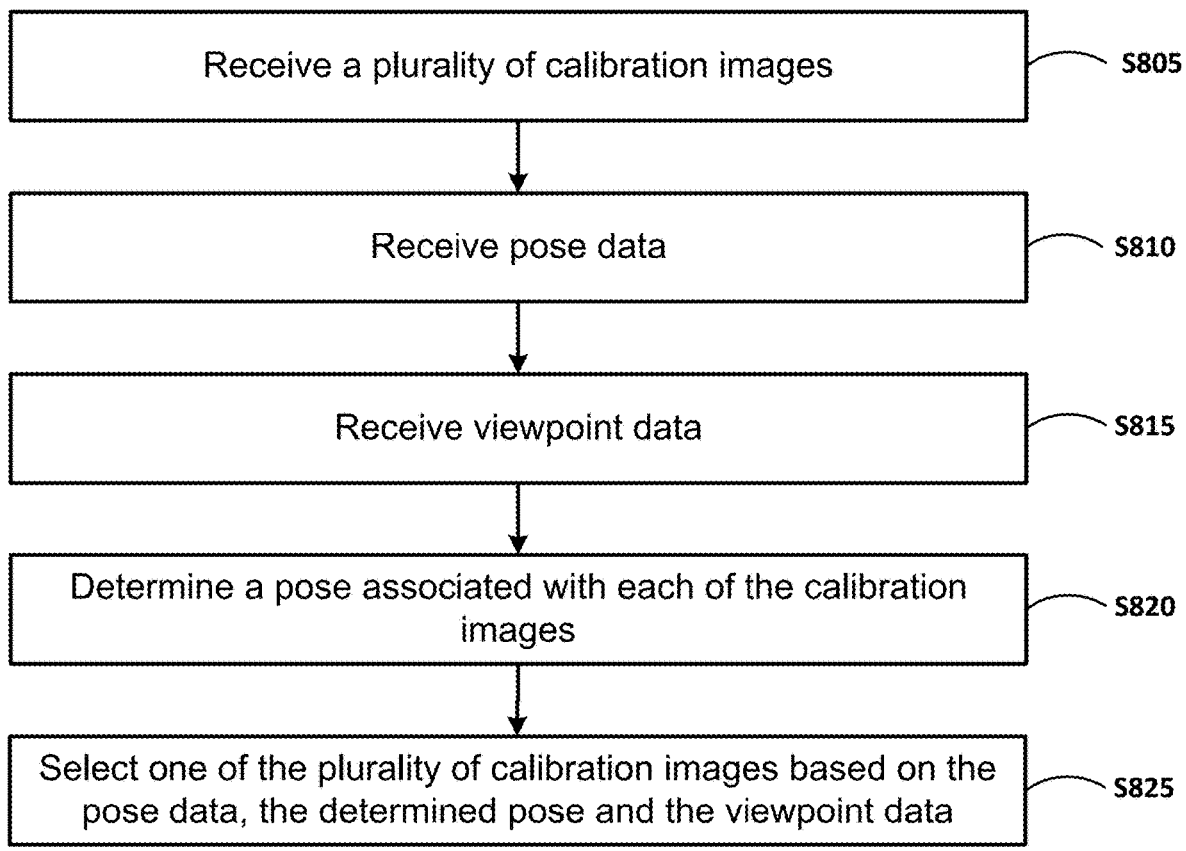
FIG. 8 illustrates a method for selecting an image according to an example implementation.

FIG. 8 illustrates a method for selecting an image according to an example implementation. As shown in step S805, a plurality of calibration images is received. For example, a calibration image can be captured using the camera (e.g., camera 105) during a calibration process as an initial or first phase (or stage or step) after initiating communication using an AR and/or VR application. The calibration image can be captured using the camera 105 while communicating using an AR and/or VR application (e.g., as a user moves, rotates, changes a position and/or changes a pose). A plurality of the calibration images can be captured and stored in memory (e.g., a memory of server 140, a library on the server 140). Accordingly, the plurality of calibration images can be read from the memory.

In step S810, pose data is received. For example, the pose that was determined above can be communicated to a module implementing this method from a module implementing a method described above.

In step S815, viewpoint data is received. For example, an AR and/or VR display (e.g., a HMD) can detect a viewpoint of a user viewing the AR and/or VR display. The viewpoint can be detected base on a position and/or a change in position of the AR and/or VR display and/or a viewing direction of the eyes of the user viewing the AR and/or VR display. Data (e.g., coordinates) representing the viewpoint of the user viewing the AR and/or VR display can be received at the computing device (e.g., server 140). The data representing the viewpoint of the user viewing the AR and/or VR display can be communicated via a wired and/or wireless communications system (e.g., during a communications event).

In step S820, a pose associated with each of the calibration images is determined. For example, 2D keypoints can be determined (e.g., calculated, computed, and/or the like) for each of the plurality of calibration images. For example, the 2D keypoints can be a small (e.g., 20, 30, 40, and the like) number of points that have coordinates along the object. The 2D keypoints can be mapped to corresponding points in a depth image of the corresponding one of the plurality of calibration images. In some implementations, missing corresponding points can be extrapolated. The pose for each of the plurality of calibration images can be determined by encoding each of the corresponding points as a Gaussian centered the point with a fixed variance.

In step S825, one of the plurality of calibration images is selected based on the pose data, the determined pose and the viewpoint data. For example, a similarity score can be determined for each of the plurality of calibration images (discussed in more detail above). In an example implementation, the image of the plurality of calibration images with the highest score can be selected as the calibration image. Alternatively, the image of the plurality of calibration images with the lowest score can be selected as the calibration image. Alternatively, the image of the plurality of calibration images with a score that satisfies some criterion (e.g., is equal to or above a threshold number, below a threshold number, and the like) can be selected as the calibration image. The score can be calculated based on weighted scores for elements of the object.

Figure 9:
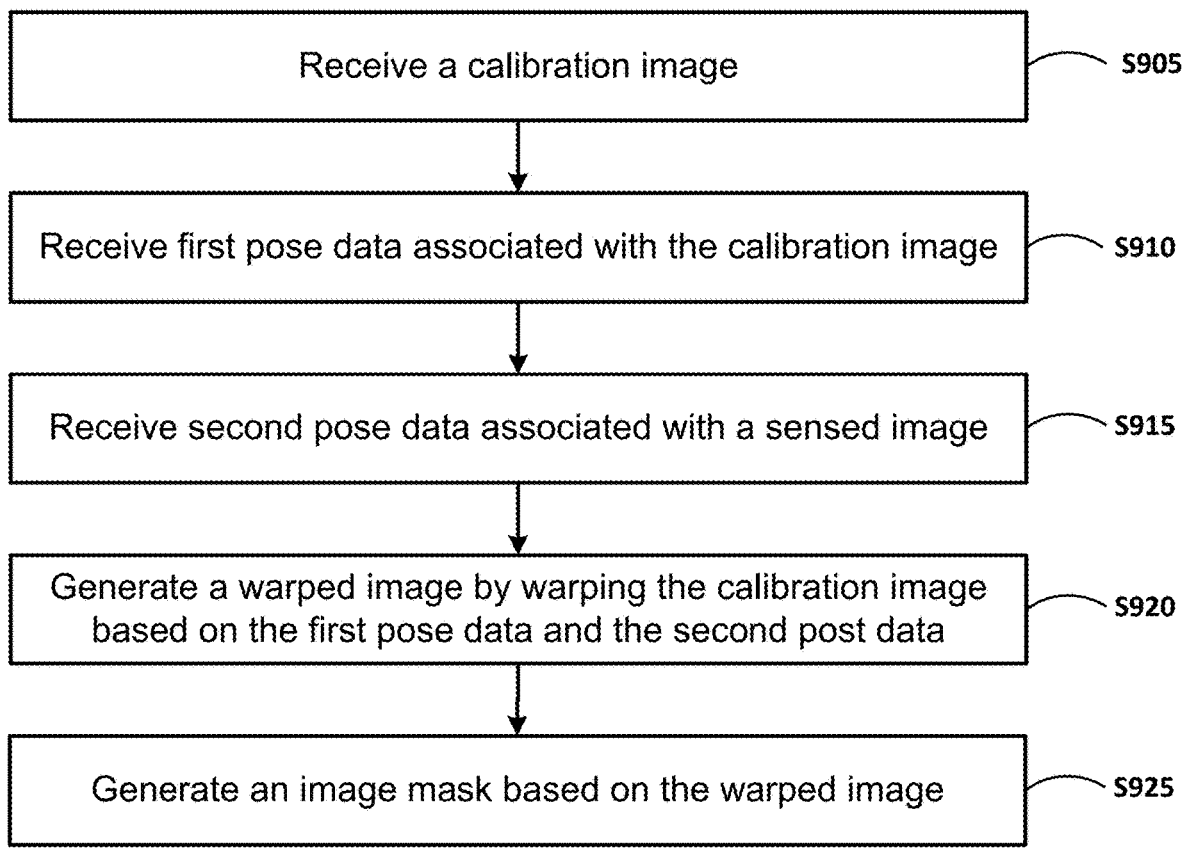
FIG. 9 illustrates a method for warping an image according to an example implementation.

FIG. 9 illustrates a method for warping an image according to an example implementation. As shown in step S905, a calibration image is received. For example, the calibration image that was selected above can be communicated to a module implementing this method from a module implementing a method described above.

In step S910, first pose data associated with the calibration image is received. For example, the pose associated with the calibration image that was selected above can be communicated to a module implementing this method from a module implementing a method described above.

In step S915 second pose data associated with a sensed image is received. For example, the pose associated with the captured image that was determined above can be communicated to a module implementing this method from a module implementing a method described above.

In step S920, a warped image is generated by warping the calibration image based on the first pose data and the second pose data. In step S925, an image mask is generated based on the warped image. For example, the selected calibration image should have a similar viewpoint to the viewpoint associated with the AR and/or VR display. However, the pose of the object in the calibration image could be different from the target or desired pose. In other words, the set of calibration images is unlikely to include an image at the target or desired pose. Therefore, the selected calibration image can be warped to generate an image equivalent to a silhouette (e.g., a silhouette image or part-image) of the object as the warped image and a silhouette mask (or part-mask) of the object in the desired pose as the image mask. According to an example implementation, a convolutional neural network can be used to warp the selected calibration image.

For example, the calibration image can pass through a first pass of a convolutional neural network (e.g., based on the U-NET model) to produce output part masks and a background mask. These masks can select which regions of the object (e.g., body) should be warped according to a similarity transformation. The warping transformations may not be learned. Instead, the warping transformations can be determined (e.g., calculated, computed, and/or the like) using equation 6 on keypoint groups of at least two 2D points.

The warped silhouette (e.g., warped silhouette image) and the warped texture can go through a second pass of the convolutional neural network (e.g., based on the U-NET model) to merge the per-part textures and refine the final foreground mask as image mask.

Figure 10:
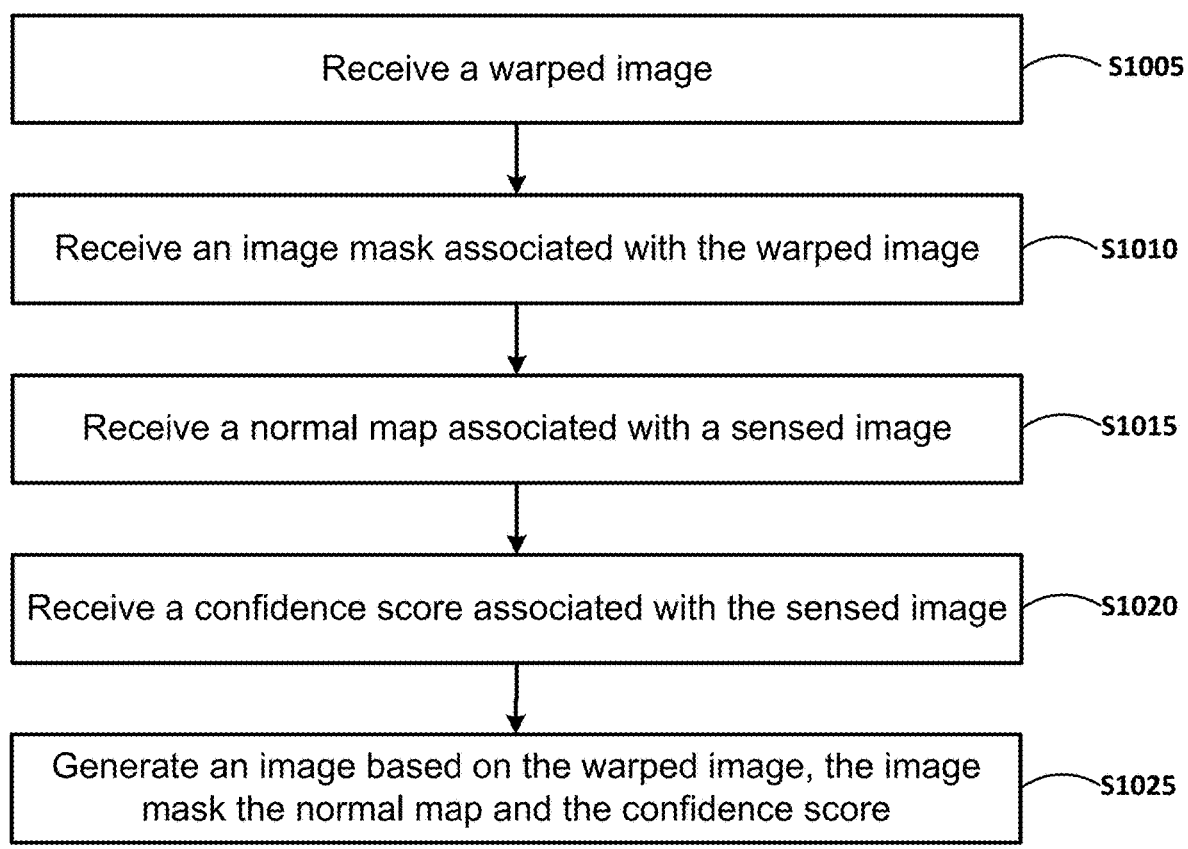
FIG. 10 illustrates a method for generating an image according to an example implementation.

FIG. 10 illustrates a method for generating an image according to an example implementation. As shown in step S1005, a warped image is received. For example, the warped image that was generated above can be communicated to a module implementing this method from a module implementing a method described above.

In step S1010, an image mask associated with the warped image is received. For example, the image mask that was generated above can be communicated to a module implementing this method from a module implementing a method described above.

In step S1015, a normal map associated with a sensed image is received. For example, the normal map that was generated above can be communicated to a module implementing this method from a module implementing a method described above.

In step S1020, a confidence score associated with the sensed image is received. For example, the confidence score that was determined above can be communicated to a module implementing this method from a module implementing a method described above.

In step S1025, an image is generated based on the warped image, the image mask the normal map and the confidence score. For example, the re-rendered image can be enhanced by the content in the warped calibration image using a neural blending operation including use of another convolutional neural network. The convolutional neural network should favor details from the re-rendered image if the viewpoint of the AR and/or VR display is close to the viewpoint of the camera, while it should leverage the texture in the warped calibration image for back-facing views.

In an example implementation, the normal map, and the confidence can be input to a convolutional neural network as an extra channel to each pixel. The additional channels contain the information used to disambiguate a frontal view(s) from a back view(s). The mask can be used as an additional feature to guide the convolutional neural network towards understanding where the network should generate missing portions (sometimes called hallucinating) of image content not visible in the re-rendered image.

Figure 11:
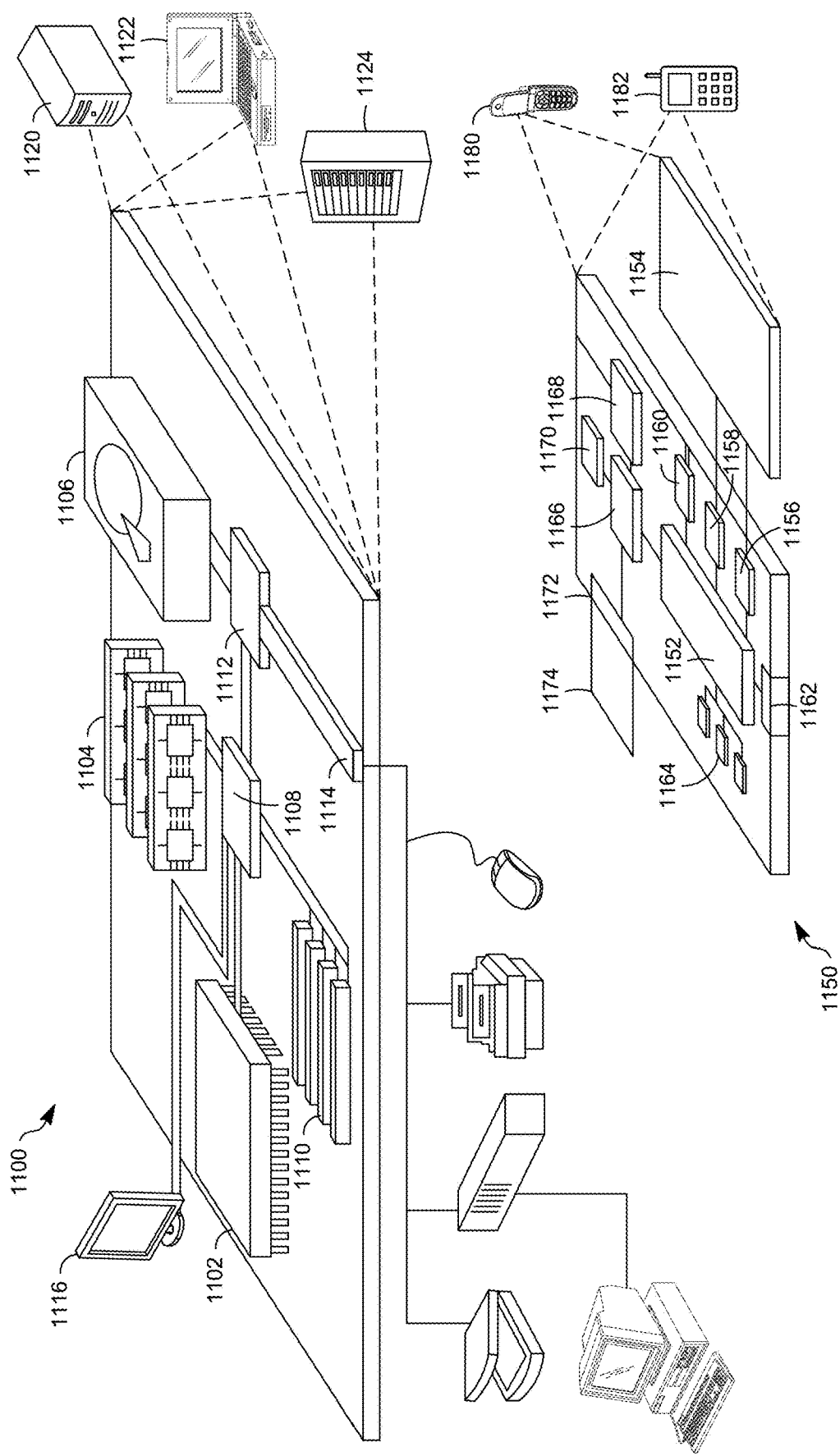
FIG. 11 shows an example of a computer device and a mobile computer device according to at least one example embodiment.

FIG. 11 shows an example of a computer device 1100 and a mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

While example embodiments may include various modifications and alternative forms, embodiments thereof are shown by way of example in the drawings and are herein described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional method not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium (non-transitory computer-readable storage medium) or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for generating an image comprising:
   receiving a first image including color data and depth data;
   determining a viewpoint associated with an augmented reality (AR) and/or virtual reality (VR) display displaying a second image;

receiving at least one calibration image including an object in the first image, the object being in a pose in the at least one calibration image different from a pose of the object in the first image; and generating the second image based on the first image, the viewpoint, the pose of the object in the first image, and the at least one calibration image, the first image and the at least one calibration image are captured using a single camera, and the pose of the object in the first image includes a position of a first portion of the object relative to a position of a second portion of the object and the pose of the object in the at least one calibration image includes a second position of the first portion of the object relative to the position of the second portion of the object.

2. The method of claim 1, wherein the single camera is configured to capture the color data as red, green, blue (RGB) data and at least one of capture the depth data and generate the depth data based on the color data.

3. The method of claim 1, wherein the viewpoint associated with the AR and/or VR display is different than a viewpoint associated with the first image.

4. The method of claim 1, wherein the at least one calibration image is a silhouette image of the object.

5. The method of claim 1, wherein the generating of the second image includes,
    determining a target pose of the object by mapping two dimensional (2D) keypoints to corresponding three dimensional (3D) points of depth data associated with the at least one calibration image, and
    generating the second image by warping the object in the at least one calibration image using a convolutional neural network that takes the at least one calibration image and the target pose of the object as input.

6. The method of claim 1, wherein the generating of the second image includes,
    generating at least one part-mask in a first pass of a convolutional neural network having the at least one calibration image as an input,
    generating at least one part-image in the first pass of the convolutional neural network, and
    generating the second image a second pass of the convolutional neural network having the at least one part-mask and the at least one part-image as input.

7. The method of claim 1, wherein the generating of the second image includes using two passes of a convolutional neural network that is trained by minimizing at least two losses associated with warping the object.

8. The method of claim 1, wherein the second image is blended using a neural network to generate missing portions of the second image.

9. The method of claim 1, wherein the second image is a silhouette image of the object, the method further comprising merging the second image with a background image.

10. The method of claim 1, further comprising:
    a pre-processing stage in which a plurality of images are captured while the pose of the object is changed;
    storing the plurality of images as the at least one calibration image;
    generating a similarity score for each of the at least one calibration image based on a target pose of the object; and
    selecting the at least one calibration image from the at least one calibration image based on the similarity score.

11. The method of claim 1, further comprising:
    a pre-processing stage in which a plurality of images are captured while the pose of the object is changed;
    storing the plurality of images as the at least one calibration image;
    capturing an image, during a communications event, the image including the object in a new pose, and
    adding the image to the stored plurality of images.

12. A non-transitory computer-readable storage medium having stored thereon computer executable program code which, when executed on a computer system, causes the computer system to perform steps comprising:
    receiving a first image including color data and depth data;
    determining a viewpoint associated with an augmented reality (AR) and/or virtual reality (VR) display displaying a second image;
    receiving at least one calibration image including an object in the first image, the object being in pose in the at least one calibration image different from a pose of the object in the first image; and
    generating the second image based on the first image, the viewpoint, a pose of the object in the first image, and the at least one calibration image,
    the first image and the at least one calibration image are captured using a single sensor, and the pose of the object in the first image includes a position of a first portion of the object relative to a position of a second portion of the object.

13. The non-transitory computer-readable storage medium of claim 12, wherein the single sensor is configured to capture the color data as red, green, blue (RGB) data and at least one of capture the depth data and generate the depth data based on the color data.

14. The non-transitory computer-readable storage medium of claim 12, wherein the generating of the second image includes,
    determining a target pose of the object by mapping two dimensional (2D) keypoints to corresponding three dimensional (3D) points of depth data associated with the at least one calibration image, and
    generating the second image by warping the object in the at least one calibration image using a convolutional neural network that takes the at least one calibration image and the target pose of the object as input.

15. The non-transitory computer-readable storage medium of claim 12, wherein the generating of the second image includes,
    generating at least one part-mask in a first pass of a convolutional neural network having the at least one calibration image as an input,
    generating at least one part-image in the first pass of the convolutional neural network, and
    generating the second image a second pass of the convolutional neural network having the at least one part-mask and the at least one part-image as input.

16. The non-transitory computer-readable storage medium of claim 12, wherein the second image is blended using a neural network to generate missing portions of the second image.

17. The non-transitory computer-readable storage medium of claim 12, wherein the second image is a silhouette image of the object, the steps further comprising merging the second image with a background image.

18. The non-transitory computer-readable storage medium of claim 12, the steps further comprising:
    a pre-processing stage in which a plurality of images are captured while the pose of the object is changed;

storing the plurality of images as the at least one calibration image;
generating a similarity score for each of the at least one calibration image based on a target pose of the object; and
selecting the at least one calibration image from the at least one calibration image based on the similarity score.

19. The non-transitory computer-readable storage medium of claim 12, the steps further comprising:
a pre-processing stage in which a plurality of images are captured while the pose of the object is changed;
storing the plurality of images as the at least one calibration image;
capturing an image, during a communications event, the image including the object in a new pose, and
adding the image to the stored plurality of images.

20. An augmented reality (AR) and/or virtual reality (VR) system comprising:

a sensor configured to capture color data and depth data; and
a processor configured to:
receive a first image from the sensor,
receive a viewpoint from an AR and/or VR display displaying a second image,
receive at least one calibration image including an object in the first image, the object being in a pose in the at least one calibration image different from a pose of the object in the first image, and
generate the second image based on the first image, the viewpoint, a pose of the object in the first image, and the at least one calibration image,
the first image and the at least one calibration image are captured using a single camera, and the pose of the object of the first image includes a relative position of different portions of the object.

* * * * *